US008848207B2

(12) United States Patent
Maruyama

(10) Patent No.: US 8,848,207 B2
(45) Date of Patent: Sep. 30, 2014

(54) COMPUTER CAPABLE OF SETTING NEW ENVIRONMENT FOR USING NEW ELECTRONIC DEVICE

(75) Inventor: Naotoshi Maruyama, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 61 days.

(21) Appl. No.: 13/458,380

(22) Filed: Apr. 27, 2012

(65) Prior Publication Data

US 2012/0274967 A1 Nov. 1, 2012

(30) Foreign Application Priority Data

Apr. 28, 2011 (JP) ................. 2011-101372

(51) Int. Cl.
G06F 3/12 (2006.01)
H04N 1/00 (2006.01)
H04N 1/32 (2006.01)

(52) U.S. Cl.
CPC ...... *H04N 1/0044* (2013.01); *H04N 2201/0075* (2013.01); *H04N 1/00503* (2013.01); *H04N 2201/0082* (2013.01); *G06F 3/1225* (2013.01); *H04N 2201/0094* (2013.01); *H04N 2201/0046* (2013.01); *H04N 1/32534* (2013.01); *H04N 1/00482* (2013.01); *G06F 3/1204* (2013.01); *H04N 1/00204* (2013.01); *H04N 1/00244* (2013.01); *H04N 1/00411* (2013.01); *H04N 1/00432* (2013.01); *H04N 2201/0044* (2013.01); *H04N 2201/0039* (2013.01); *H04N 1/00421* (2013.01); *H04N 1/00424* (2013.01); *H04N 1/32529* (2013.01); *H04N 1/00517* (2013.01); *H04N 1/00474* (2013.01); *G06F 3/1205* (2013.01)
USPC .......... 358/1.13; 358/1.15; 715/700; 717/168

(58) Field of Classification Search
CPC ... G06F 3/1203; G06F 3/1225; G06F 3/1288; G06F 3/1302; G06F 3/1228; G06F 9/4411; G06F 3/1205; H04N 1/00222; H04N 1/00474; H04L 41/0806; H04L 41/22
USPC ................ 358/1.13, 1.9, 1.15; 710/10, 39
See application file for complete search history.

(56) References Cited

U.S. PATENT DOCUMENTS

2005/0210464 A1 9/2005 Machida
2008/0244043 A1* 10/2008 Kawai ........................ 709/221
2009/0279113 A1* 11/2009 Awata ......................... 358/1.13

(Continued)

FOREIGN PATENT DOCUMENTS

| JP | 2000-353079 A | 12/2000 |
|---|---|---|
| JP | 2004-326426 A | 11/2004 |
| JP | 2010-102402 A | 5/2010 |
| JP | 2010-186324 A | 8/2010 |

*Primary Examiner* — Benny Q Tieu
*Assistant Examiner* — Juan M Guillermety
(74) *Attorney, Agent, or Firm* — Edwards Wildman Palmer LLP; David G. Conlin; Steven M. Jensen

(57) ABSTRACT

A computer allowing a user to use, even when the printing device is changed, a new printing device in a state close to a familiar environment of use is provided. The computer includes a determining unit determining whether an existing environment for using another electronic device used for the same usage as the new electronic device has been set in the computer. The computer further includes a setting unit selectively executing a process for setting an environment for using the new electronic device in the computer using the existing environment as a reference, and a process for setting a default setting for using the new electronic device in the computer, depending on a result of determination.

4 Claims, 15 Drawing Sheets

(56) References Cited

U.S. PATENT DOCUMENTS

| | | | |
|---|---|---|---|
| 2010/0115155 A1* | 5/2010 | Otsuka et al. | 710/39 |
| 2010/0118330 A1* | 5/2010 | Feijoo et al. | 358/1.15 |
| 2010/0165391 A1* | 7/2010 | Nagashima | 358/1.15 |
| 2010/0259787 A1* | 10/2010 | Nagashima | 358/1.15 |

* cited by examiner

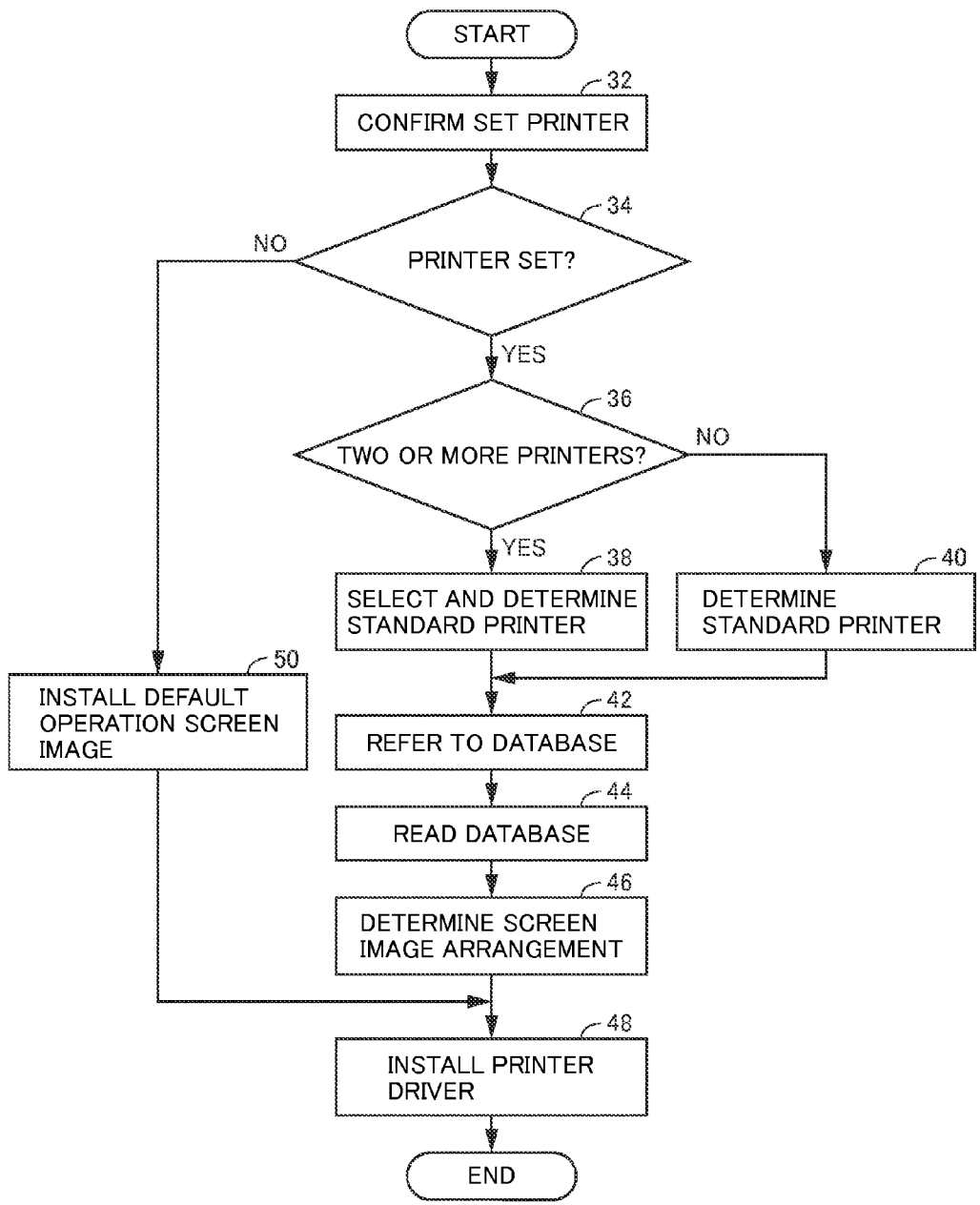

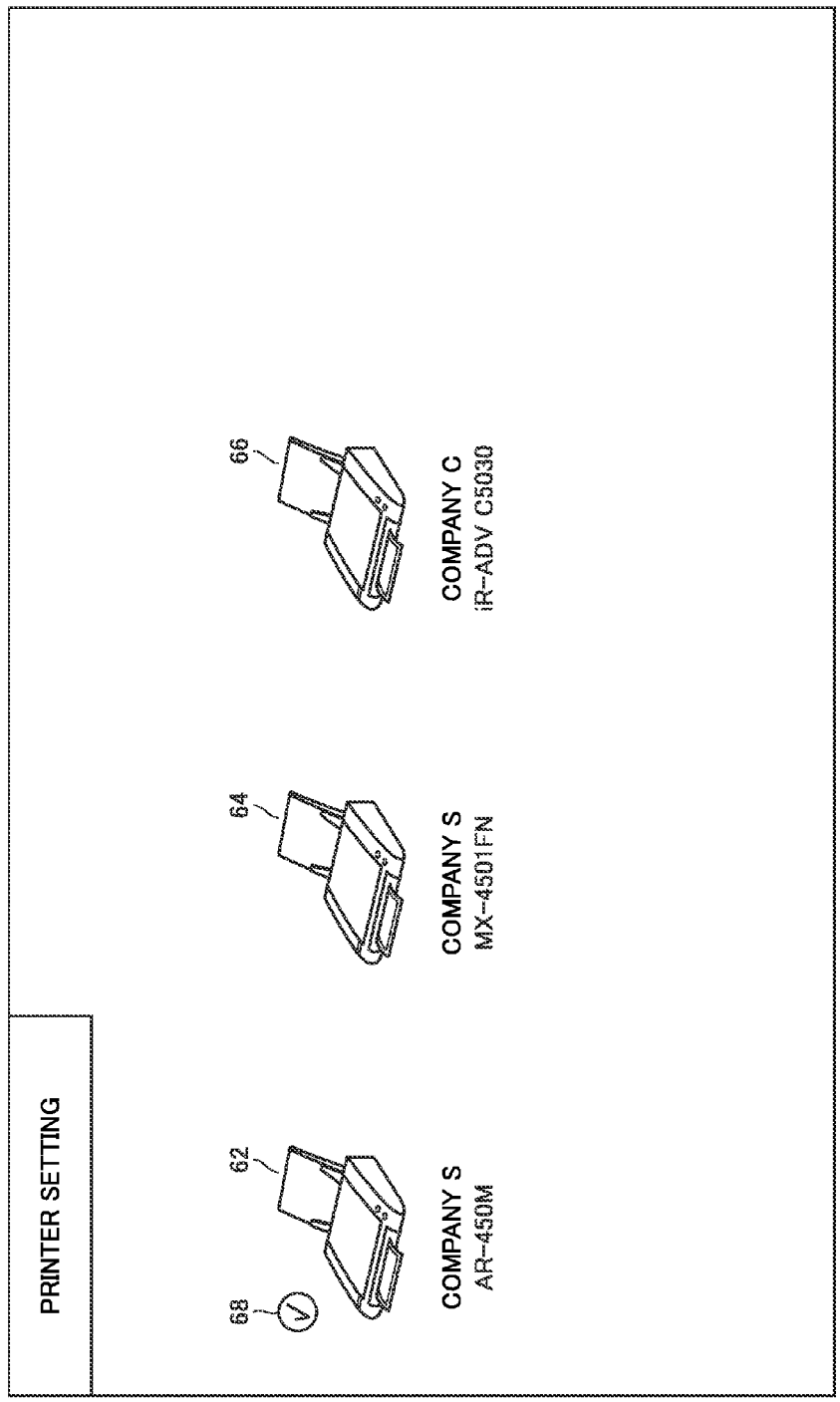

FIG. 6

● DRIVER TO BE INSTALLED

90

| MANUFACTURER | PRINTER | IDENTIFIER |
|---|---|---|
| S社 | MX-2300F | MX2300F_A.bmp<br>MX2300F_B.bmp |

82

| MANUFACTURER | PRINTER | IDENTIFIER | SCREEN IMAGE ARRANGEMENT TO BE APPLIED |
|---|---|---|---|
| COMPANY S | AR-450M | AR450M_a.bmp | MX2300F_A.bmp |
|  |  | AR450M_b.bmp | MX2300F_B.bmp |
| COMPANY S | MX-4501FN | MX4501_1.bmp | MX2300F_A.bmp |
|  |  | MX4501_2.bmp | MX2300F_A.bmp |
|  |  | MX4501_3.bmp | MX2300F_B.bmp |
| COMPANY C | iR-ADV C5030 | iRADV C5030_A.bmp | MX2300F_A.bmp |
|  |  | iRADV C5030_B.bmp | MX2300F_A.bmp |
|  |  | iRADV C5030_C.bmp | MX2300F_B.bmp |
|  |  | iRADV C5030_D.bmp | MX2300F_A.bmp |

84
86
88

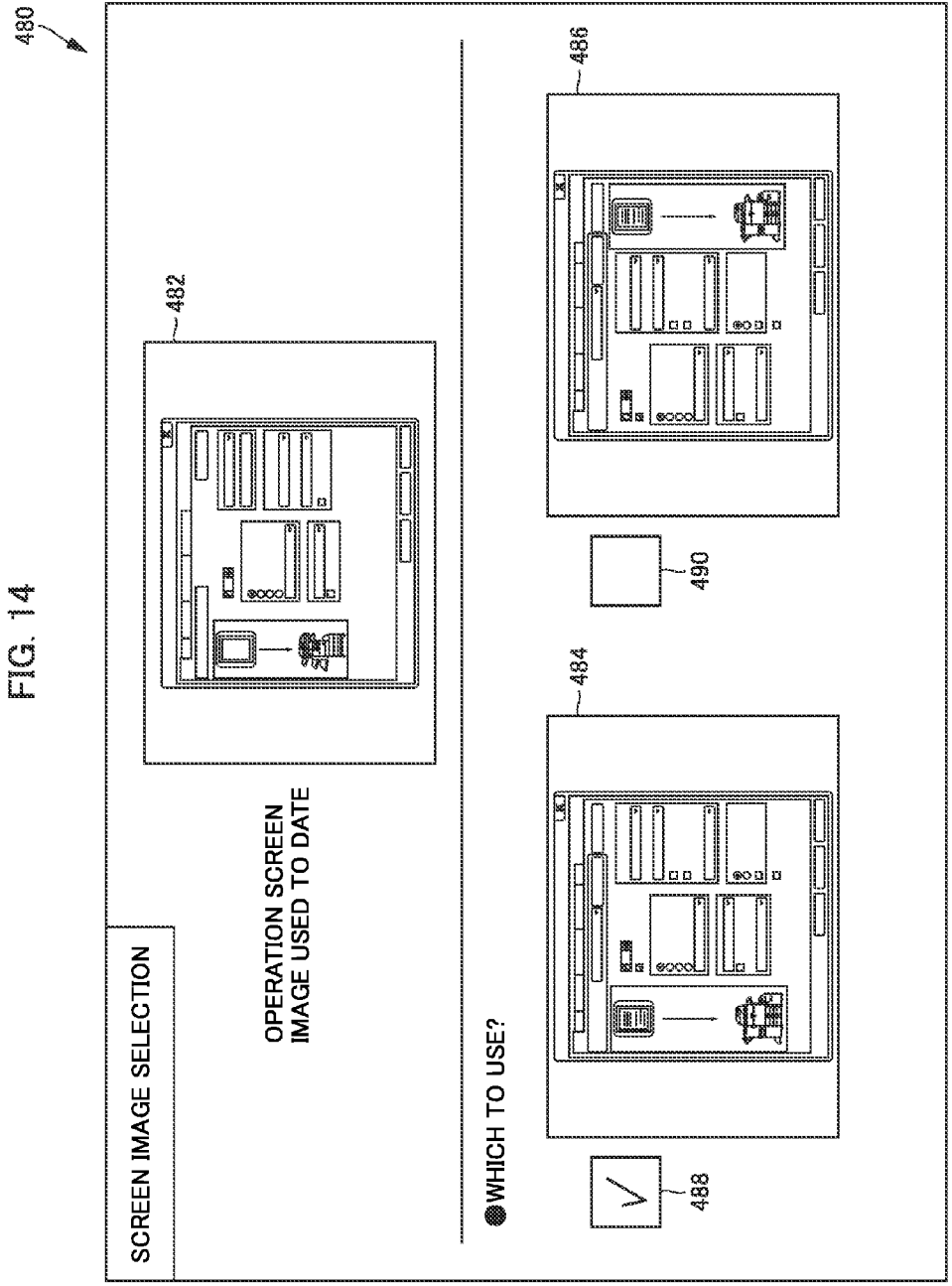

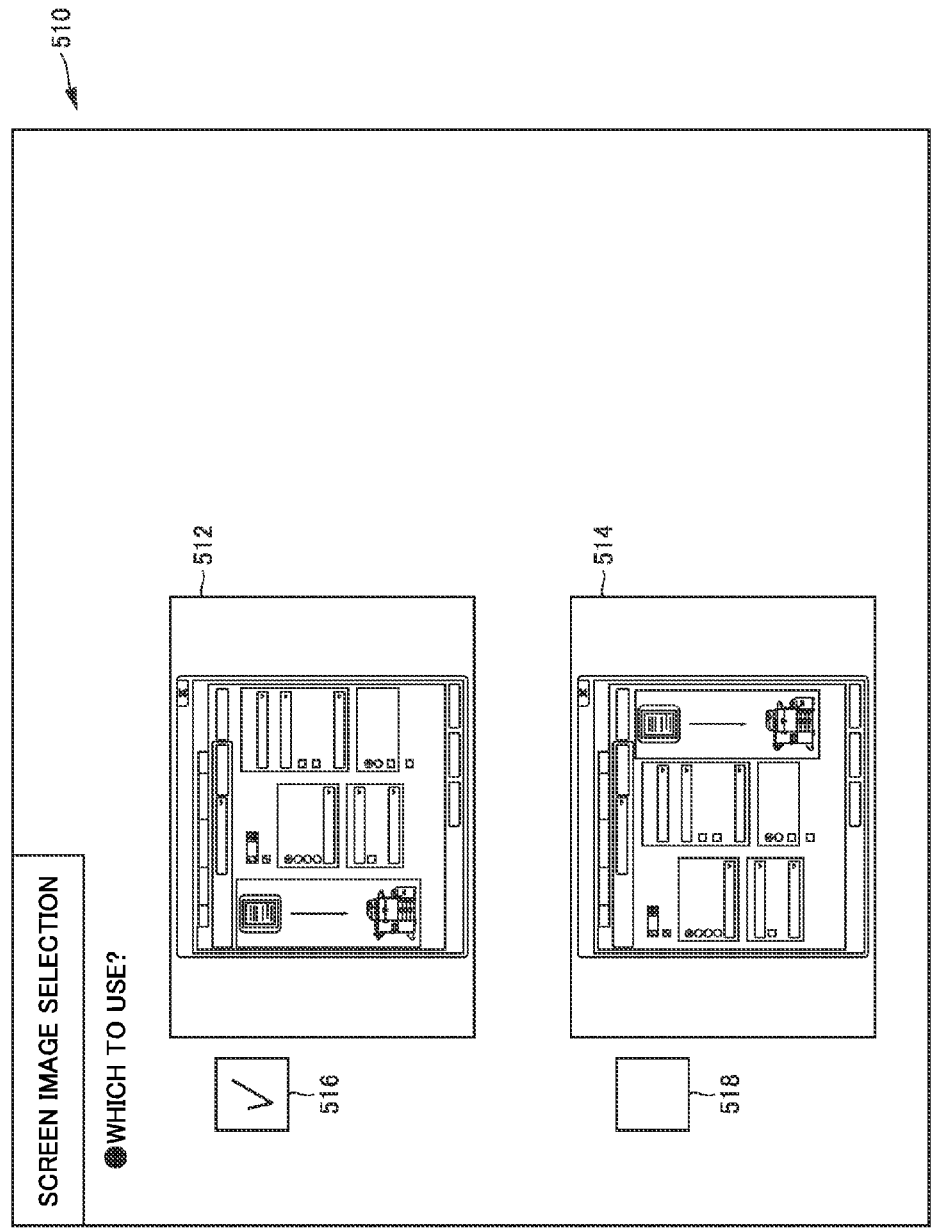

COMPUTER CAPABLE OF SETTING NEW ENVIRONMENT FOR USING NEW ELECTRONIC DEVICE

CROSS-REFERENCE TO RELATED APPLICATION

This nonprovisional application claims priority under 35 U.S.C. §119(a) on Patent Application No. 2011-101372 filed in Japan on Apr. 28, 2011, the entire contents of which are hereby incorporated by reference.

BACKGROUND OF THE INVENTION

1. Field of the Invention

The present invention relates to a computer and, more specifically, to a computer that allows, when a process to enable connection of the computer to an external electronic device is executed, easy setting of conditions of use for the electronic device.

2. Description of the Background Art

Document data created by a computer is printed mostly by a printing device connected to the computer. It is possible for the user to set how the printing is to be done, using an operation screen image displayed on the computer. Screen image arrangement and method of operation of the operation screen image differ dependent on the printing device that is connected. Therefore, when the printing device to be connected is changed, the method of operating the operation screen image changes accordingly and, therefore, every time the printing device is changed, the user must be accustomed to the manner of operation of the changed operation screen image.

As a technique for making easier the use of operation screen image, Japanese Patent Laying-Open No. 2004-326426 discloses a technique allowing the user to adjust the order of display of operation screen images. The operation screen image includes a plurality of selection screen images and as the user sets the order of display of these selection images in advance, the operation screen images are displayed in the order as desired by the user. Japanese Patent Laying-Open No. 2010-102402 discloses a technique that can set a plurality of setting items to be displayed on one operation screen image.

Though these techniques change the operation screen images to be more convenient for the user, operations required for this purpose are complicated and, therefore, the problems described above are left unsolved.

SUMMARY OF THE INVENTION

Therefore, an object of the present invention is to provide a computer that allows the user to use, when a printing device is changed, the new printing device in an environment close to a familiar environment.

According to a first aspect, the present invention provides a computer capable of setting a new environment for using a new electronic device, including: a first determining unit determining whether or not an existing environment for using another electronic device used for the same usage as the new electronic device has been set in the computer; and a setting unit, selectively executing a process for setting an environment for using the new electronic device in the computer using the existing environment for using the above-mentioned another electronic device as a reference, and a process for setting a default environment for using the new electronic device in the computer, depending on a result of determination by the first determining unit.

By the computer, using an existing environment for using one electronic device as a reference, an environment for using a new electronic device can be set in the computer. Therefore, the user can use the new electronic device in surroundings familiar to the user. Further, for the setting, the user can select whether or not the default environment is to be used.

Preferably, the setting unit includes a second determining unit determining, in response to a determination by the first determining unit that the existing environment has been set in the computer, whether two or more existing environments are set in the computer, a selecting unit selecting, in response to a determination that two or more existing environments are set, an environment set as a default environment in the computer, a first setting unit setting an environment for using the new electronic device in the computer, using the default environment selected by the selecting unit as a reference, and a second setting unit setting, in response to a determination by the first determining unit that the existing environment has not been set in the computer, a predetermined default environment for the new electronic device in the computer.

If there is a plurality of existing environments, any one of the plurality of existing environments is selected and set as the default environment in the computer. If no existing environment is set in the computer, a predetermined default environment is set in the computer. Therefore, it is possible for the user to set the environment for using the new electronic device in accordance with the state how the existing environment or environments are saved.

More preferably, the setting of new environment involves install of a driver program for driving the new electronic device in the computer and determination of a format of an operation screen image for setting operation conditions of the driver program; and the first setting unit includes a first driver program setting unit setting the driver program of the new electronic device such that an operation screen image that is determined using an operation screen image used in the default environment selected by the selecting unit as a reference is used.

The driver program of the new electronic device is set such that the operation screen image that is determined based on the operation screen used in the default environment as a reference is used. Therefore, the operation screen image when the new electronic device is used comes to be similar to the operation screen image used when another electronic device is used. Thus, the user can use the new electronic device through the operation screen image that is similar to a conventional one.

More preferably, the computer further includes a display device. The setting of new environment involves install of a driver program for driving the new electronic device in the computer and determination of a format of an operation screen image for setting operation conditions of the driver program; the driver program for the new electronic device includes in advance a plurality of operation screen images; and the first setting unit includes a display control unit displaying an operation screen image used in the default environment selected by the selecting unit and the plurality of operation screen images in a contrasting manner on the display device, and a first driver program setting unit, urging the user to select one of the plurality of operation screen images displayed on the display device, and setting the driver program of the new electronic device to use the selected operation screen image.

The operation screen image used in the default environment and the plurality of operation screen images are displayed on the display device in a contrasting manner, the user selects one of them, and the user can set the driver program of the new electronic device to use the selected operation screen image. Since the operation screen image used in the default environment is displayed in contrast to the selected screen image, the user can select and set the operation screen image for the new electronic device while looking at the default screen image as a reference.

More preferably, the computer further includes a display device. The driver program for the new electronic device includes in advance a plurality of operation screen images; and the second setting unit includes a screen image display control unit displaying the plurality of operation screen images in a contrasting manner to each other on the display device, and a second driver program setting unit, urging the user to select one of the plurality of operation screen images displayed on the display device, and setting the driver program of the new electronic device to use the selected operation screen image.

A plurality of operation screen images are included in advance in the driver program of the new electronic device, and the images are displayed on the display device in a contrasting manner. Therefore, it is possible for the user to compare the plurality of operation screen images and to select one.

More preferably, the computer has a driver program for driving the new electronic device installed in advance. The setting of new environment involves determination of a format of an operation screen image for setting operation conditions of the driver program for driving the new electronic device; and the first setting unit includes a driver program setting unit setting the driver program of the new electronic device such that an operation screen image that is determined using the operation screen image used in the default environment selected by the selecting unit as a reference is used.

The driver program of the new electronic device is programmed such that the operation screen image that is determined based on the operation screen used in the default environment as a reference is used. Therefore, the operation screen image when the new electronic device is used comes to be similar to the operation screen image used when another electronic device is used. Thus, the user can use the new electronic device through the operation screen image that is similar to a conventional one.

More preferably, the computer further includes a display device and has a driver program for driving the new electronic device installed in advance. The setting of new environment involves determination of a format of an operation screen image for setting operation conditions of the driver program for driving the new electronic device; the driver program for the new electronic device includes in advance a plurality of operation screen images; and the first setting unit includes a display control unit displaying an operation screen image used in the default environment selected by the selecting unit and the plurality of operation screen images in a contrasting manner on the display device, and a driver program setting unit, urging the user to select one of the plurality of operation screen images displayed on the display device, and setting the driver program of the new electronic device to use the selected operation screen image.

The operation screen image used in the default environment and the plurality of operation screen images are displayed on the display device in a contrasting manner, the user selects one of them, and the user can set the driver program of the new electronic device to use the selected operation screen image. Since the operation screen image used in the default environment is displayed in contrast to the selected screen image, the user can select and set the operation screen image for the new electronic device while looking at the default screen image as a reference.

More preferably, the new electronic device is an image forming apparatus.

Using an existing environment for using one image forming apparatus as a reference, the user can set an environment for using a new image forming apparatus in the computer.

More preferably, the new electronic device is an image reading apparatus.

Using an existing environment for using one image reading apparatus as a reference, the user can set an environment for using a new image reading apparatus in the computer.

According to a second aspect, the present invention provides an environment setting method of setting a new environment in a computer to enable use of a new electronic device, including: the determining step of determining whether or not an existing environment for using another electronic device used for the same usage as the new electronic device has been set in the computer; and the setting step of selectively executing a process for setting an environment for using the new electronic device in the computer using the existing environment for using the above-mentioned another electronic device as a reference, and a process for setting a default environment for using the new electronic device in the computer, depending on a result of determination at the determining step.

By the environment setting method, using an existing environment for using one electronic device as a reference, an environment for using a new electronic device can be set in the computer. Therefore, the user can use the new electronic device in surroundings familiar to the user. Further, for the setting, the user can select whether or not the default environment is to be used.

Preferably, the setting step includes: the step of determining, in response to a determination at the determining step that the existing environment has been set in the computer, whether two or more existing environments are set in the computer, the step of selecting, in response to a determination that two or more existing environments are set, an environment set as a default environment in the computer, the first setting step of setting an environment for using the new electronic device in the computer, using the default environment selected at the selecting step as a reference, and the second setting step of setting, in response to a determination at the determining step that the existing environment has not been set in the computer, a predetermined default environment for the new electronic device in the computer.

More preferably, the setting of new environment involves install of a driver program for driving the new electronic device in the computer and determination of a format of an operation screen image for setting operation conditions of the driver program; and the first setting step includes the step of setting the driver program of the new electronic device such that an operation screen image that is determined using the operation screen image used in the default environment selected at the selecting step as a reference is used.

More preferably, the setting of new environment involves install of a driver program for driving the new electronic device in the computer and determination of a format of an operation screen image for setting operation conditions of the driver program; the driver program for the new electronic device includes in advance a plurality of operation screen images; and the first setting step includes the step of displaying an operation screen image used in the default environment selected at the selecting step and the plurality of operation screen images in a contrasting manner on a display device of the computer, and the step of urging the user to select one of the plurality of operation screen images displayed on the display device, and setting the driver program of the new electronic device to use the selected operation screen image.

More preferably, the driver program for the new electronic device includes in advance a plurality of operation screen images; and the second setting step includes the step of displaying the plurality of operation screen images in a contrasting manner to each other on a display device of the computer, and the step of urging the user to select one of the plurality of operation screen images displayed on the display device, and setting the driver program of the new electronic device to use the selected operation screen image.

More preferably, the computer has a driver program for driving the new electronic device installed in advance; the setting of new environment involves determination of a format of an operation screen image for setting operation conditions of the driver program for driving the new electronic device; and the first setting step includes the step of setting the driver program of the new electronic device such that an operation screen image that is determined using the operation screen image used in the default environment selected at the selecting step as a reference is used.

More preferably, the computer has a driver program for driving the new electronic device installed in advance; the setting of new environment involves determination of a format of an operation screen image for setting operation conditions of the driver program for driving the new electronic device; the driver program for the new electronic device includes in advance a plurality of operation screen images; and the first setting step includes the step of displaying an operation screen image used in the default environment selected at the selecting step and the plurality of operation screen images in a contrasting manner on a display device of the computer, and the step of urging the user to select one of the plurality of operation screen images displayed on the display device, and setting the driver program of the new electronic device to use the selected operation screen image.

More preferably, the new electronic device is an image forming apparatus.

More preferably, the new electronic device is an image reading apparatus.

By the computer and the environment setting method of the present invention, when a new printing device is connected to the computer, it is possible for the user to operate the operation screen image of the printing device in a manner similar to the method of operating the operation screen image that has been familiar to the user. Thus, it is unnecessary for the user to learn the method of operating the operation screen image from scratch, and hence, printing error can be reduced.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 4 is a flowchart representing a control structure of a computer program for realizing the network image forming system in accordance with a first embodiment.

FIG. 5 is a setting screen image of a standard printer.

FIG. 6 shows exemplary data related to the driver of an MFP in the system in accordance with the first embodiment.

FIGS. 14 and 15 show examples of selection screen images for selecting an operation screen image of the MFP.

DESCRIPTION OF THE PREFERRED EMBODIMENTS

<<First Embodiment>>

Figure 1:
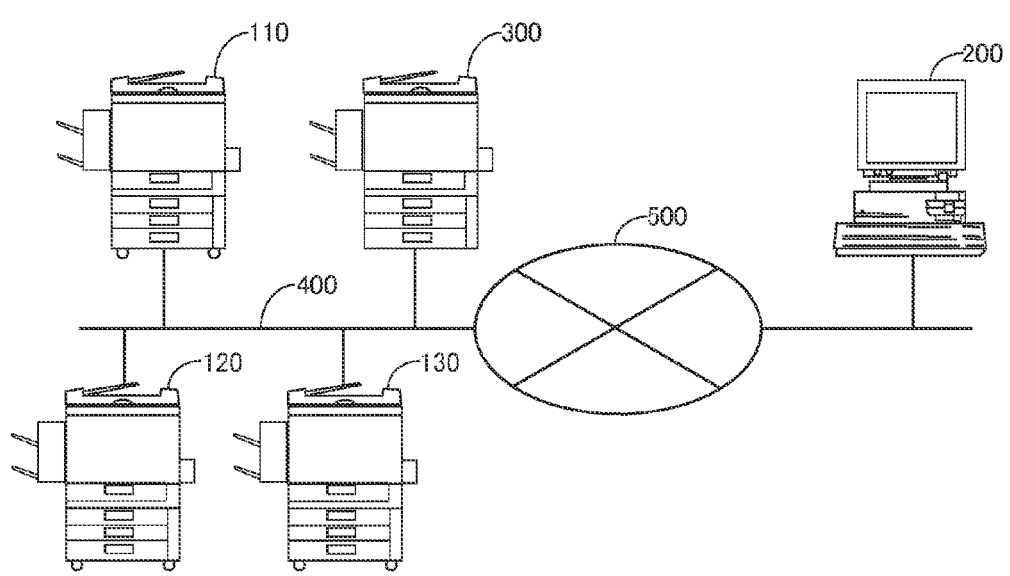
FIG. 1 shows an overall configuration of a network image forming system in accordance with an embodiment of the present invention.

In the following description and in the drawings, the same components are denoted by the same reference characters. Therefore, detailed description thereof will not be repeated. Detailed description of the same process executed in a different embodiment will not be repeated, either.

[Overall System Configuration]

Referring to FIG. 1, a network image forming system in accordance with the present embodiment includes a computer 200 creating and processing image data in accordance with operation instructions from a user, and MFPs 110, 120, 130 and 300, receiving an instruction from computer 200 and printing image data. These components are connected to be communicable, by means of a network line (internal LAN line) 400 and the Internet 500. The Internet 500 may be an intra-net.

In the following, an example will be described in which MFPs 110, 120 and 130 already have their drivers installed in computer 200, and the driver for MFP 300 is to be newly installed in computer 200.

[Hardware Configuration]

<Computer 200>

Figure 2:
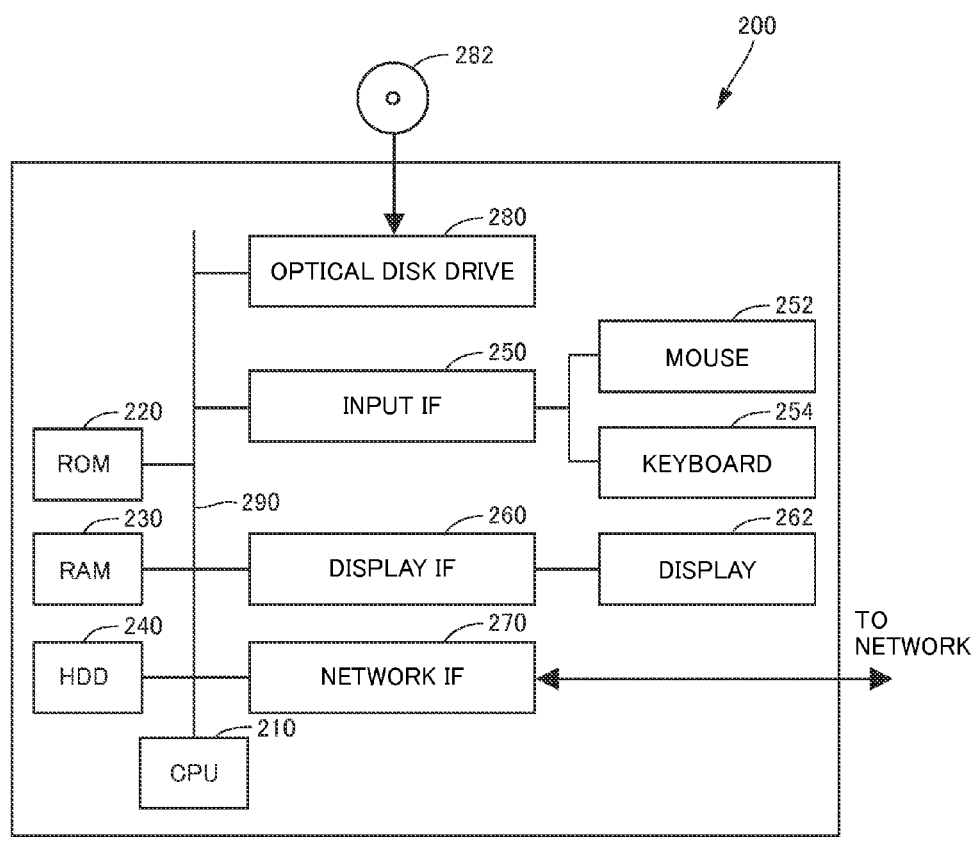
FIG. 2 is a control block diagram showing a hardware configuration of the computer shown in FIG. 1.

Referring to FIG. 2, computer 200 includes: a bus 290; a CPU (Central Processing Unit) 210 connected to bus 290; an ROM (Read Only Memory) 220 connected to bus 290; an RAM (Random Access Memory) 230 connected to bus 290; a hard disk (HDD) 240 connected to bus 290; an optical disc drive 280 connected to bus 290, to which an optical disc 282 is loaded, and which is capable of writing information to optical disc 282 and reading information from optical disc 282; an input interface (hereinafter referred to as "input IF") 250 connected to bus 290, for providing an interface for connection to a mouse 252 and a keyboard 254; a display interface (hereinafter referred to as "display IF") 260 connected to bus 290, for providing an interface for connection to a display 262; and a network interface (hereinafter referred to as "network IF") 270 for providing wired or wireless (in the present embodiment, wired) connection to network line 400. Computer 200 may include a magnetic disk drive to which a magnetic disk is loaded, and which is capable of writing information to the magnetic disk and reading information from the magnetic disk, in place of/in addition to optical disc drive 280.

A computer program for operating computer 200 is stored in optical disc 282 to be loaded to optical disc drive 280, and further transferred to HDD 240. The program may be transmitted through network line 400 to computer 200 and stored in HDD 240. The program is loaded to RAM 230 when executed. The program may be directly loaded to RAM 230 from optical disc 282 or through network line 400.

The program includes a plurality of instructions for operating computer 200. Some of the basic functions are provided by an operating system (OS) operating on computer 200 or a third-party program, or by modules of various tool kits installed in computer 200. Therefore, the program may not necessarily include all the functions necessary to realize the system and method of the present embodiment. The program may include only those of the instructions which execute prescribed processes of computer 200 by calling appropriate functions or "tools (groups of programs each realizing a prescribed function)" in a manner controlled to realize desired results. Since general operations of a computer implementing computer 200 are well known, description thereof will not be given here.

<MFP 300>

Figure 3:
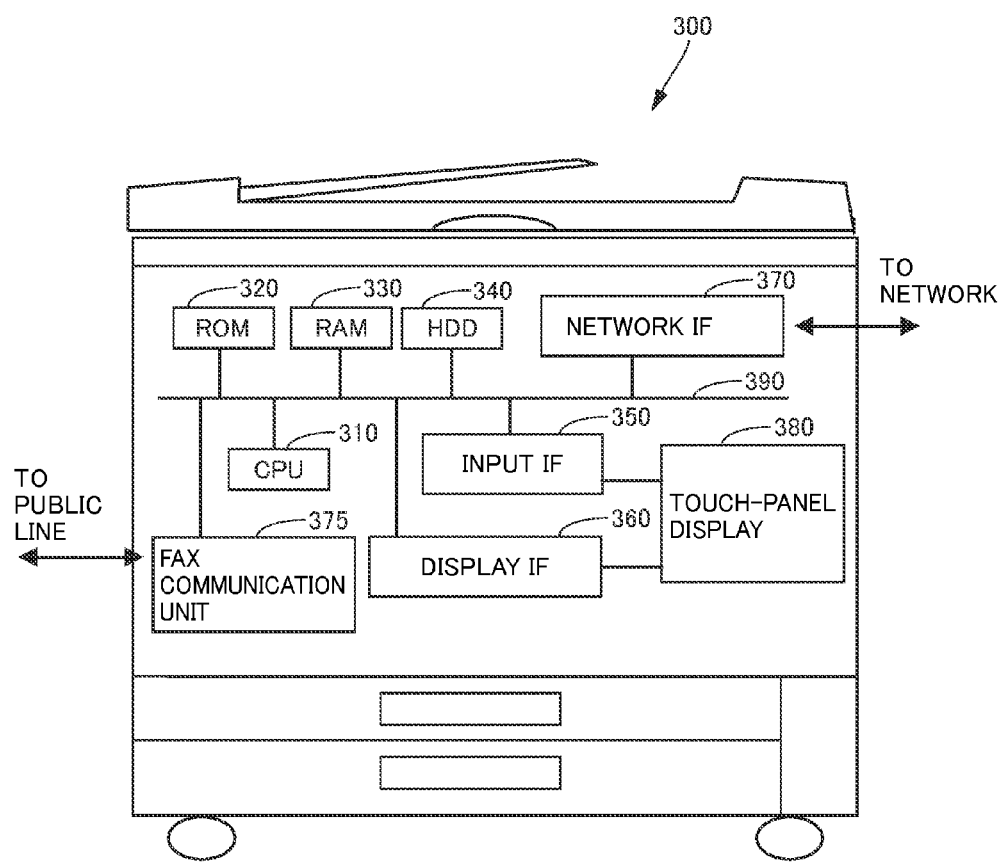
FIG. 3 is a control block diagram showing a hardware configuration of an MFP (Multifunctional Printer) shown in FIG. 1.

Referring to FIG. 3, MFP 300 constituting the network image forming system in accordance with the present embodiment includes: a bus 390; a CPU 310 connected to bus 390; an ROM 320 connected to bus 390; an RAM 330 connected to bus 390; a hard disk (HDD) 340 connected to bus 390; an input IF 350 and a display IF 360 connected to bus 390 for providing interfaces for connection to a touch-panel display 380; and a network IF 370 and a FAX communication unit 375, connected to bus 390, for providing wired or wireless (in the present embodiment, wired) connection to network line 400 and connection to a public line, respectively. Though not shown in FIG. 3, MFP 300 has hardware buttons including a start button and ten-key buttons.

Touch-panel display 380 in MFP 300 in accordance with the present embodiment displays a menu of basic functions, and receives user inputs related to selection of a mode or a function, or related to a value of a setting item (for example, a numerical value of magnification) related to the selected function. Further, MFP 300 has a browser function for displaying data received from computer 200 on touch-panel display 380.

Bus 390, ROM 320, RAM 330, HDD 340, input IF 350, display IF 360, network IF 370 and FAX communication unit 375 operate in cooperation with each other under the control of CPU 310, and realize printing process, FAX transmission/reception process, scanner process and copy process in MFP 300. These processes are executed by various components constituting MFP 300 not shown in FIG. 3, under the control of CPU 310.

By way of example, MFP 300 includes a document reading unit (scanner unit), an image forming unit, a paper feed unit and a paper discharge device. In MFP 300, document image data read from the document reading unit are subjected to various image processing operations. The image data after image processing are output to the image forming unit. MFP 300 has a so-called laser (electrophotographic) printing function utilizing a laser beam for exposure. The MFP may have a different type printing function.

[Software Configuration]

Referring to FIGS. 4 to 6, a control structure of a program executed by computer 200 when the driver of MFP 300 is newly installed in computer 200 in the present embodiment will be described. The program is activated in response to a user instruction, or in response to loading of a medium recording the install program to the corresponding drive.

Referring to FIG. 4, at step 32, CPU 210 confirms the status of setting of the printing device or devices having their drivers installed in computer 200. At step 34, CPU 210 determines whether or not there is a printing device having its driver installed in computer 200. If the determination is positive, the control proceeds to step 36, and if it is negative, the control proceeds to step 48.

At step 36, CPU 210 determines whether there is a plurality of printing devices having their drivers installed in computer 200. If the determination is positive, the control proceeds to step 38, and if it is negative, the control proceeds to step 40.

At step 38, CPU 210 selects and determines which of MFPs 110, 120 and 130 having their drivers installed is to be used as a printing device whose data related to the driver are to be used as a reference (hereinafter referred to as a "standard printer") when the driver of MFP 300 is installed to computer 200. When an operation screen image for setting operation conditions of MFP 300 is to be determined, CPU 210 refers to the operation screen image of the standard printer. The specific manner of reference will be described later.

In the present embodiment, the printing device set by the user as the "default printing device" is used as the standard printer. Referring to FIG. 5, on a setting screen image 70 of a printing device shown on display 262, icons 62, 64 and 66 indicating MFPs 110, 120 and 130 having their drivers already installed in computer 200 are displayed. Further, below icons 62, 64 and 66, names of manufacturers and models of respective printers are displayed. Near the icon 62 representing MFP 110, a check mark 68 is displayed, indicating that MFP 110 is set as the "default printing device." On the other hand, at step 40 shown in FIG. 4, CPU 210 sets a printing device having its driver already installed to be the standard printer.

At step 42, CPU 210 looks up as a reference the data related to the driver of standard printer, in the database saved on the Internet 500. Referring to FIG. 6, in the database, data related to the operation screen images of printing devices are stored, model by model of the printing devices. Data 90 related to the driver of MFP 300 include data related to the operation screen image of MFP 300 and data related to all types of operation screen images, of all types of printing devices, of all default manufacturers. Data configuration displays 82 to 88 represent data related to the driver of MFP 300 as well as drivers of MFPs 110, 120 and 130 having their drivers installed in computer 200, among the data recorded in the database. Each data configuration display includes the manufacturer's name and model name of the printing device, as well as an identifier indicating the type of operation screen image of the printing device. Further, the data configuration displays 84 to 88 include displays of identifiers of operation screen images to be applied to MFP 300, for each operation screen image of each printing device. By way of example, assume that MFP 110 is set as the standard printer, and the operation screen image of MFP 110 is set to AR450M_a.bmp indicated by data configuration display 84. Here, the operation screen image for MFP 300 is determined to be MX2300F_A.bmp. Using this database, when a standard printer is set, the operation screen image of the printing device to be installed is uniquely determined.

Again referring to FIG. 4, at step 44, CPU 210 reads the data looked up as a reference at step 42 from the database. Further, at step 46, based on the data and the operation screen image of the standard printer determined at step 38 or 40, CPU 210 determines the arrangement of the operation screen image of MFP 300.

At step 48, CPU 210 installs the printer driver of MFP 300 based on the setting of the operation screen image. If the determination at step 34 is negative, a default operation screen image of MFP 300 is installed at step 50, and a driver set to use the screen image is installed at step 48. After execution of step 48, the control ends.

[Setting of Operation Screen Image]

As described above, in the present embodiment, the operation screen image of the printing device to be installed is uniquely determined corresponding to the standard printer. Such correspondence is recorded in advance in the database, based on which of the plurality of operation screen images of the printing device to be installed is closest to the arrangement of operation screen image of the standard printer. This will be described with reference to FIGS. 6 to 9.

Figure 7:
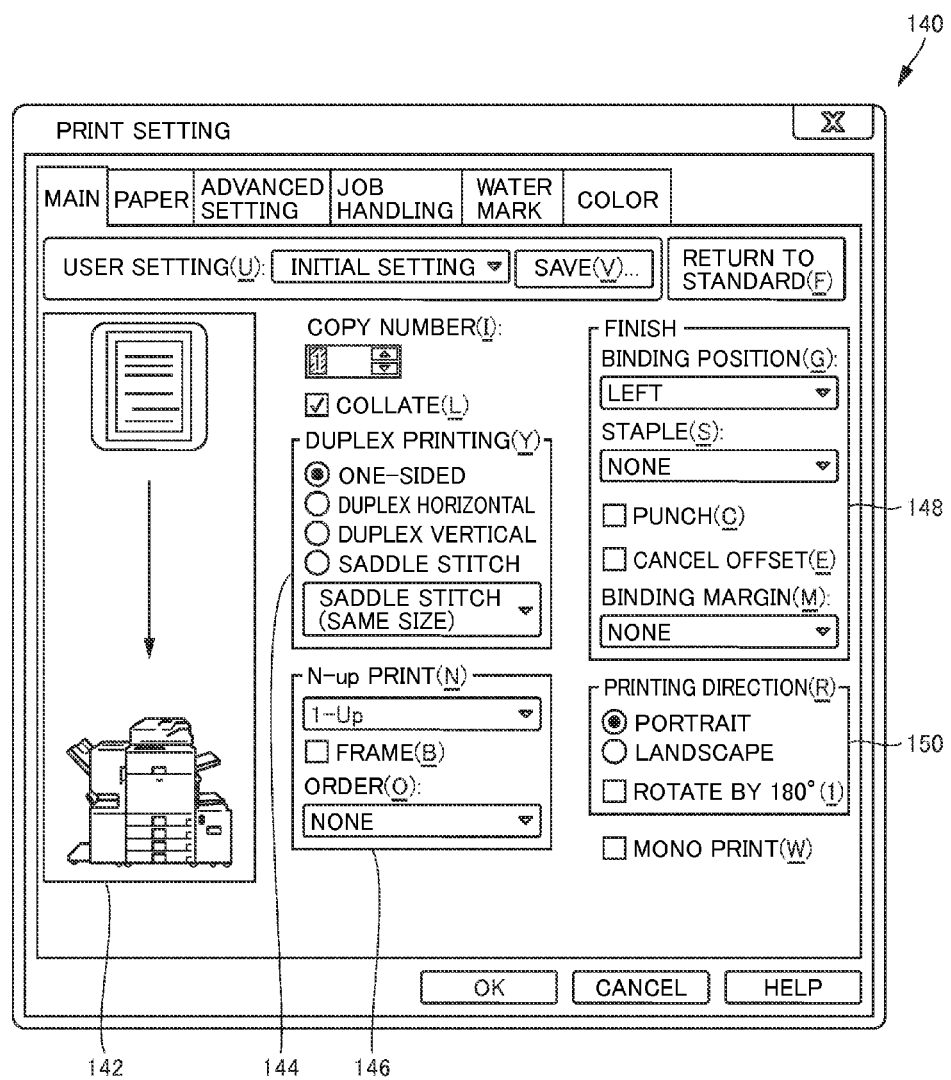
FIGS. 7 and 8 show examples of operation screen images of the MFP.
Figure 8:
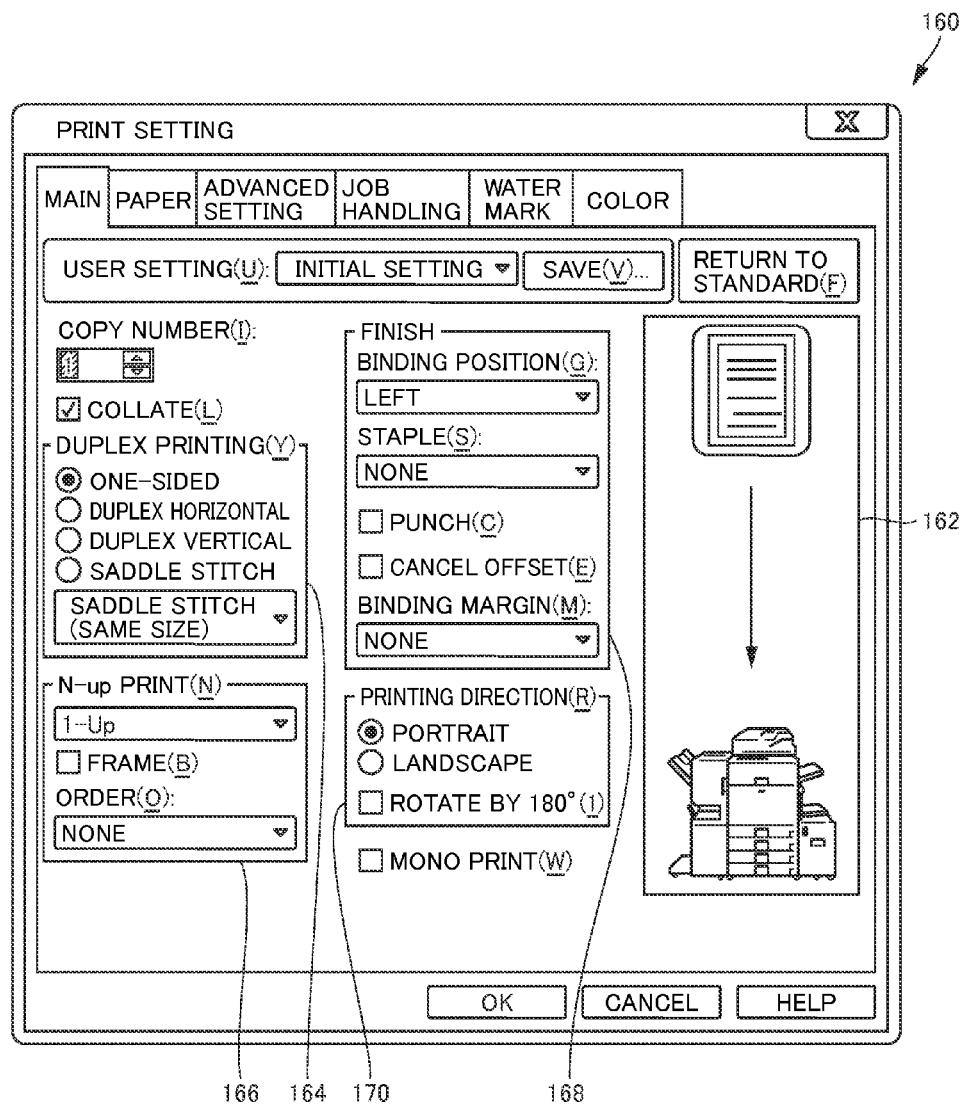

An operation screen image 140 shown in FIG. 7 and an operation screen image 160 of FIG. 8 are operation screen images specified by the identifiers MX2300F_A.bmp and MX2300F_B.bmp of data configuration display 82 of FIG. 6. Further, an operation screen image 180 of FIG. 9 is an operation screen image specified by the identifier AR450M_a.bmp of data configuration display 84 of FIG. 6, which is the screen image set for the standard printer.

Referring to FIG. 7, by way of example, operation screen image 140 displays: a document display area 142 illustrating how the document data is printed; a printing surface setting area 144 for setting a printing surface; an N-up print setting area for setting how many pages of the document are to be collectively printed on one sheet of paper; a finish setting area 148 for setting staple position, binding margin and the like; and a document direction setting area 150 for setting the printing direction of the document data. These areas are arranged in such a layout as shown in FIG. 7.

Referring to FIG. 8, similar to operation screen image 140, operation screen image 160 displays: document display area 162; printing surface setting area 164; N-up print setting area 166; finish setting area 168; and document direction setting area 170. When operation screen image 140 of FIG. 7 is compared with operation screen image 160 of FIG. 8, it can be seen that though displayed contents of respective areas are similar, the screen image layout is different as can be noticed from different display positions of document display areas 142 and 162.

Figure 9:
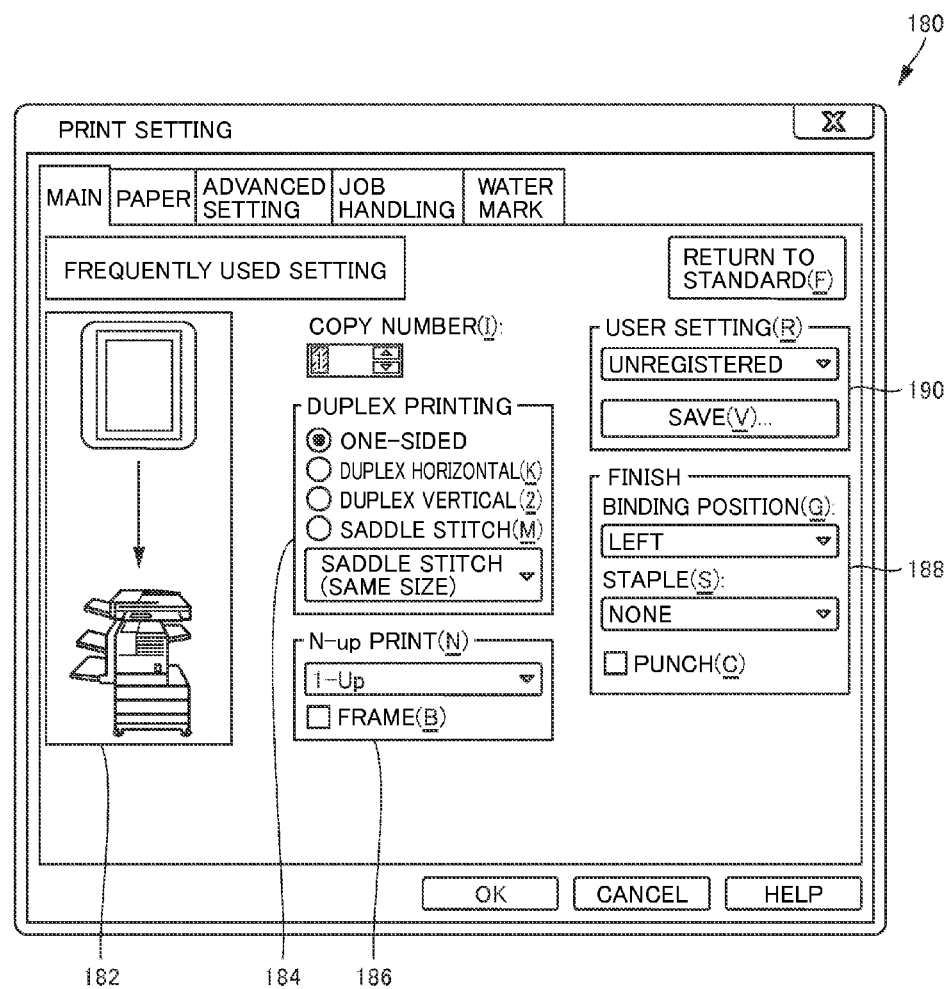
FIG. 9 shows an operation screen image of the standard printer.

Referring to FIG. 9, operation screen image 180 displays: document display area 182; printing surface setting area 184; N-up print setting area 186; finish setting area 188; and a user setting area 190 for setting a user of the document data. These areas are displayed in such a layout as shown in FIG. 9.

Referring to the data shown in FIG. 6, which of the operation screen images 140 and 160 is to be set as the operation screen image of MFP 300 is determined depending on which is more similar to the operation screen image 180 of the standard printer. When operation screen images 140, 160 and 180 are compared, it is found that operation screen image 140 has the layout structure more similar to operation screen image 180, with the document display area positioned on the left side of the screen image. Therefore, the program is set such that operation screen image 140 (operation screen image indicated by identifier MX2300F_A.bmp) is applied, as shown in the data configuration of FIG. 6.

By the computer program in accordance with the present embodiment, when the driver of MFP 300 is to be installed in computer 200, among the operation screen images available for the driver of MFP 300, one that has similar arrangement to the operation screen image of the standard printer is automatically selected and set. If no printing device has been installed, an operation screen image is automatically set from among the operation screen images available for the printer driver of MFP 300. Therefore, after a general install operation, the user can use an operation screen image similar to the familiar operation screen image on the newly installed printing device. Thus, it becomes unnecessary for the user to learn the method of operating the new operation screen image and, as a result, error in printing can be reduced.

[Modification]

The computer program in accordance with the present embodiment is applicable not only when a printing device such as an MFP is installed but also when an image reading apparatus such as a scanner is installed. In such a situation also, the operation of the computer program is similar to that described above and, therefore, program configuration will not be repeated. It is noted, however, that the arrangement of operation screen image is different to some extent.

Figure 10:
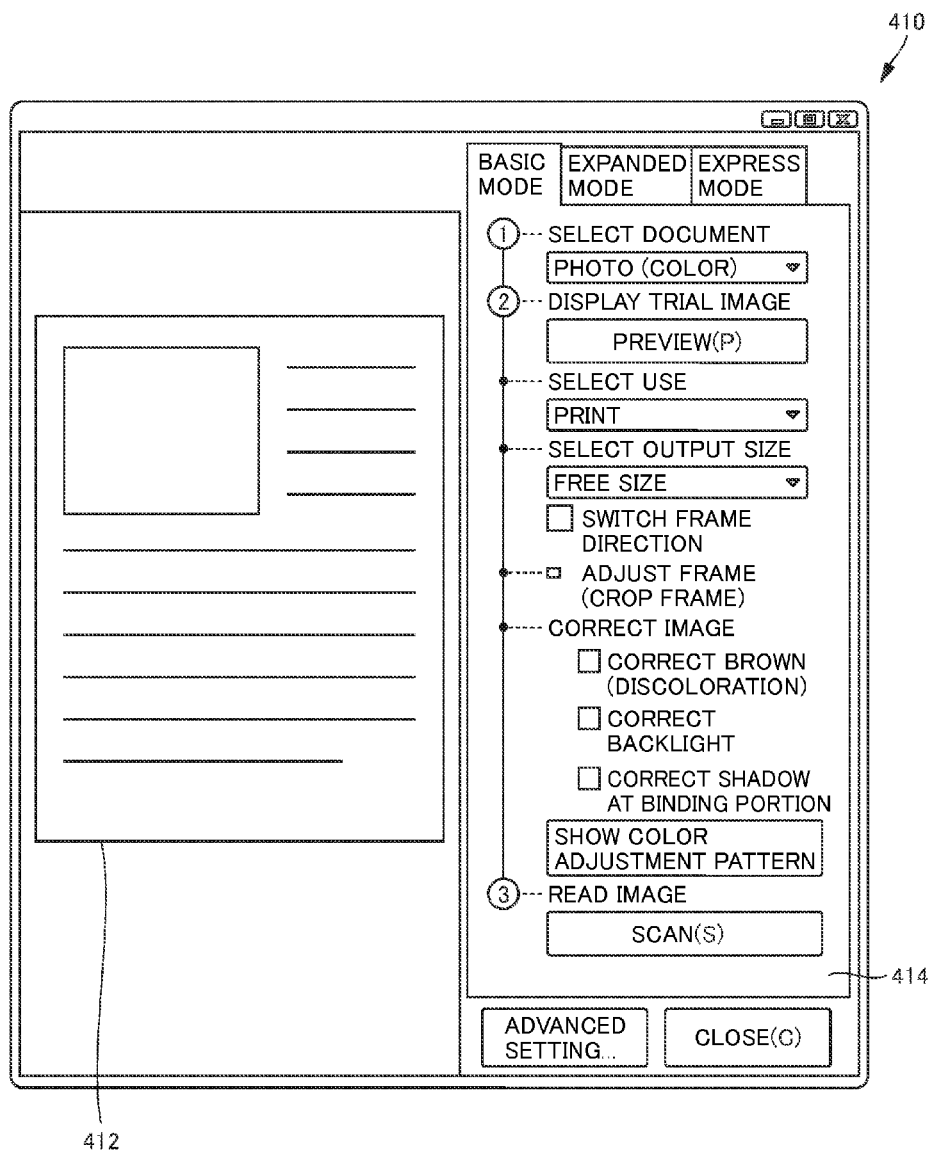
FIGS. 10 and 11 show examples of operation screen images of the image reading apparatus.
Figure 11:
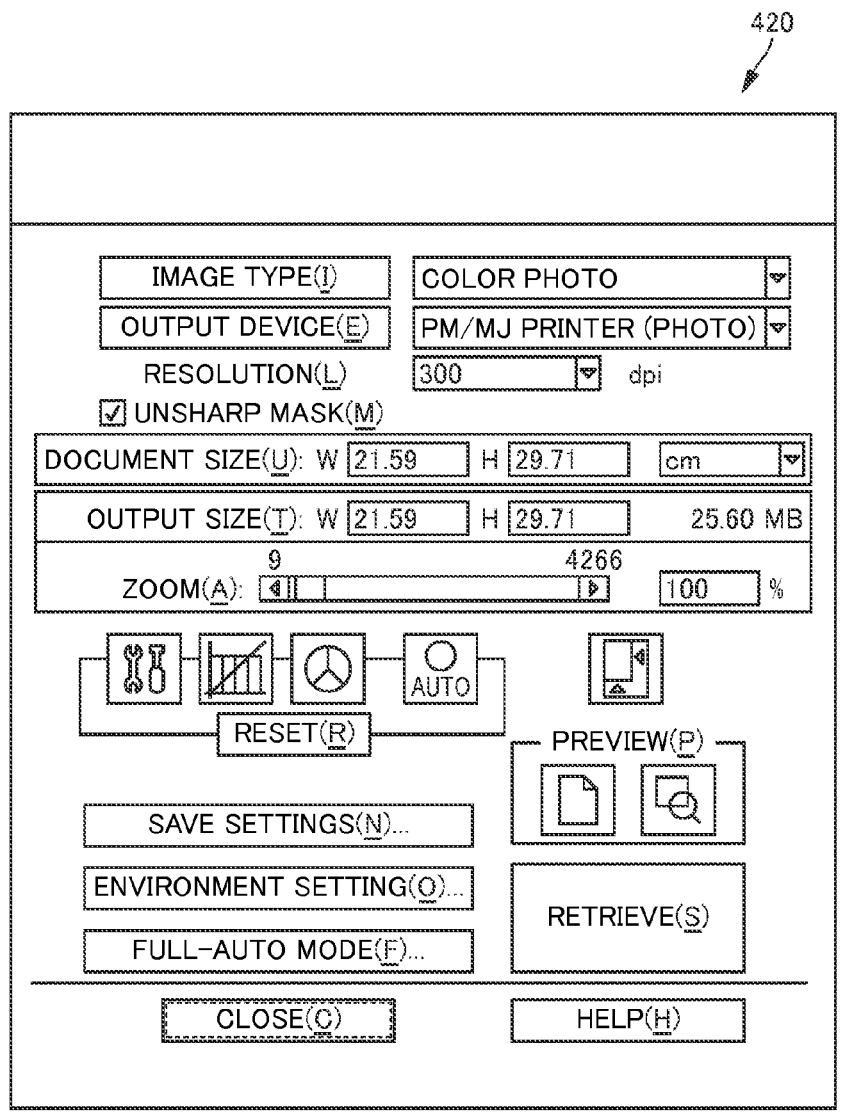

Referring to FIG. 10, by way of example, an operation screen image 410 of a scanner displays: a preview display area 412 giving a preview display of scanned image data; and a scanning conditions setting area 414 for setting how the image data is to be scanned. Referring to FIG. 11, an operation screen image 420 of another scanner simply displays setting items related to reading of image data.

When the driver of a new scanner is to be installed in the computer, the install program operates such that the operation screen image similar to the operation screen image of a standard scanner is set for the scanner to be installed. By way of example, if the operation screen image of standard scanner has such an arrangement as represented by operation screen image 410, the operation screen image of the scanner to be installed is determined based on whether the preview display area and the scanning conditions setting area are both included and based on whether the items displayed in the scanning conditions setting area are displayed in an order similar to that in area 414.

<<Second Embodiment>>

In the first embodiment, the operation screen image of the driver of a newly installed printing device is automatically determined based on the operation screen image of a standard printer. In the present embodiment, the user can select the operation screen image of the printing device to be installed, while looking at the operation screen image of the standard printer as a reference.

[Software Configuration]

Figure 12:
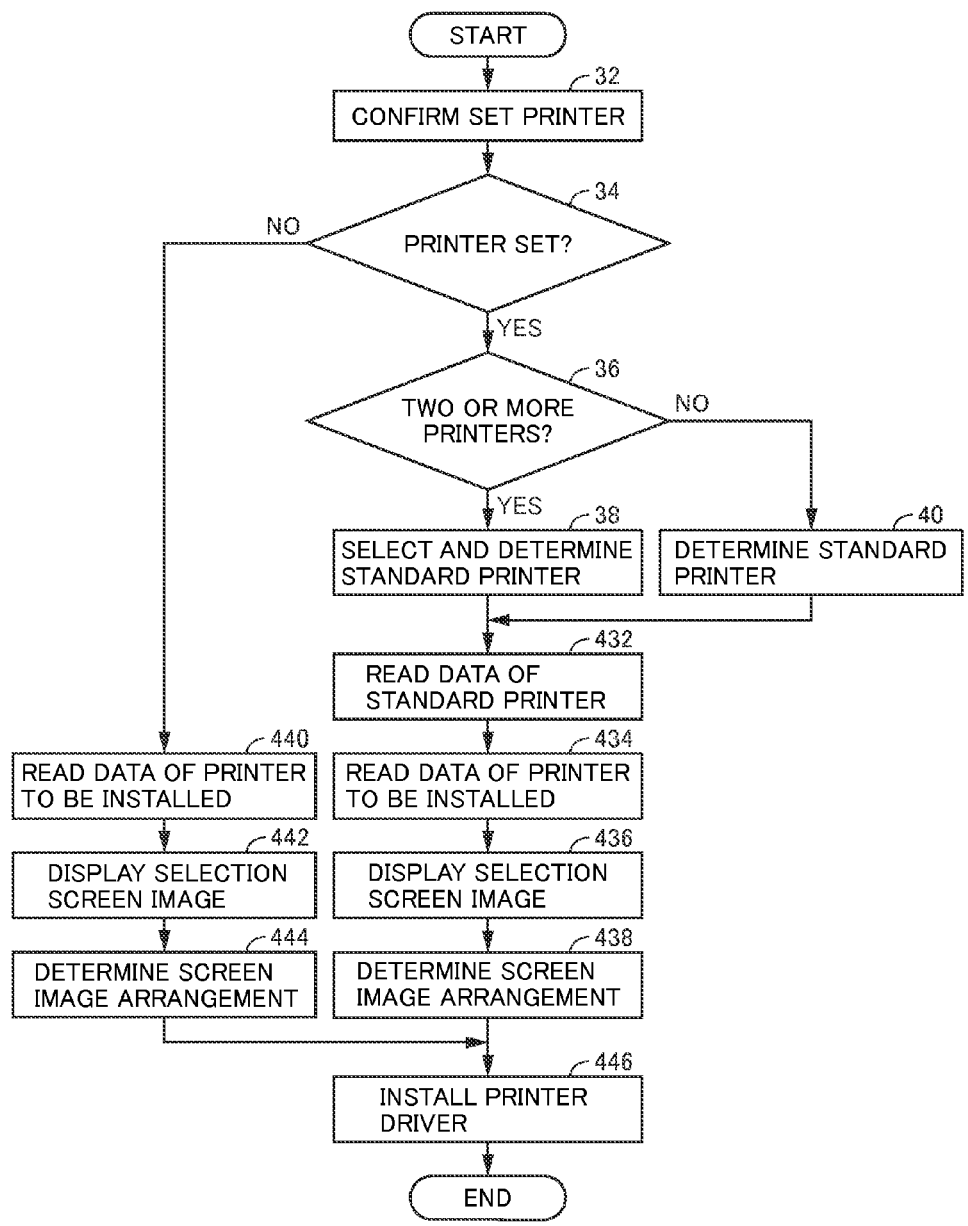
FIG. 12 is a flowchart representing a control structure of a computer program for realizing the network image forming system in accordance with a second embodiment.
Figure 13:
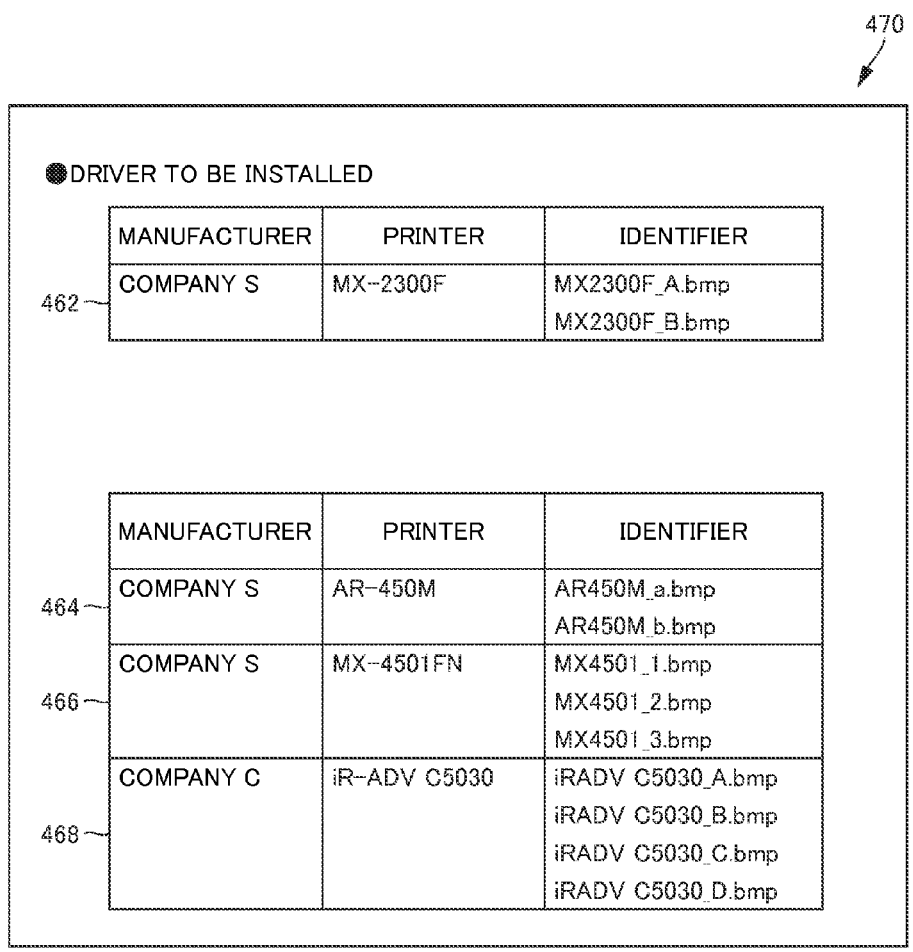
FIG. 13 shows exemplary data related to the driver of an MFP in the system in accordance with the second embodiment.

Referring to FIGS. 12 to 14, a control structure of a program executed by computer 200 when the driver of MFP 300 is installed in computer 200 in the present embodiment will be described. Since steps 32 to 40 of FIG. 12 are the same as those of the first embodiment above, description thereof will not be repeated here.

Referring to FIG. 12, at step 432, CPU 210 reads data related to the driver of standard printer selected at step 38 or 40 from the database. Referring to FIG. 13, data 470 related to the driver of newly installed MFP 300 include data related to operation screen images of various printing devices. Data configuration displays 462, 464, 466 and 468 represent data related to the operation screen images of MFPs 300, 110, 120 and 130, respectively. Of these, CPU 210 reads data represented by data configuration display 464 related to MFP 110 as the standard printer.

Further, at step 434, CPU 210 reads data represented by data configuration display 462 related to MFP 300 to be newly installed.

At step 436, based on the data read at steps 432 and 434, CPU 210 forms and displays a selection screen image 480 shown in FIG. 14. Referring to FIG. 14, on selection screen image 480, a display 482 of operation screen image of standard printer and displays 484 and 486 of operation screen images for MFP 300 to be newly installed are displayed.

Check boxes 488 and 490 serving as radio buttons are displayed near operation screen image displays 484 and 486, respectively. It is possible for the user to select which of operation screen image displays 484 and 486 is to be set as the operation screen image for MFP 300, while looking at operation screen image display 482 as a reference. If the user checks either check box 488 or 490, CPU 210 determines the checked operation screen image to be the design of the operation screen image of MFP 300 (step 438). Then, the control proceeds to step 446.

At step 34, if it is determined that no printing device has been connected to computer 200, control proceeds to step 440. At step 440, CPU 210 reads data related to the driver of MFP 300 to be newly installed, from the database. Based on the data, CPU 210 displays a selection screen image 510 shown in FIG. 15 (step 442). On selection screen image 510, operation screen image displays 512 and 514 representing operation screen images for MFP 300, and check boxes 516 and 518 serving as radio buttons are displayed. Since a plurality of operation screen images available for MFP 300 are displayed as a list, it is possible for the user to select which of the operation screen images is to be set as the operation screen image for MFP 300, while comparing the plurality of operation screen images.

When the user checks either one of the check boxes, the corresponding operation screen image is determined to be the operation screen image for MFP 300 (step 444). Then, the control proceeds to step 446.

At step 446, CPU 210 sets the driver of MFP 300 to use the selected operation screen image, and installs the driver in computer 200. After the completion of step 46, execution of the program ends.

In the present embodiment, the user can determine the operation screen image to be set, while comparing a plurality of operation screen images available for the printing device to be newly installed. Particularly, if there is an already set standard printer, the user can determine the operation screen image to be installed while viewing the operation screen image of the standard printer as a reference. The user can select a desired operation screen image, and by selecting an operation screen image similar to the one that has been used, it becomes unnecessary for the user to learn the method of operating the operation screen image from scratch.

The computer program in accordance with the present embodiment is also applicable when an image reading apparatus is installed, not only when a printing device is installed. The structure of the program when an image reading apparatus is installed is the same as described above and, therefore, description thereof will not be repeated here.

The computer program in accordance with the present embodiment is executed when a driver of a printing device or an image reading apparatus is installed in the computer. The driver to be installed is not limited to the drivers of these electronic devices. Further, the program may be executed not at the time of installing.

The standard printer is not limited to the one set as the "default printer." By way of example, frequency of use of a plurality of printing devices already set in computer 200 may be detected in advance, and the printing device of which frequency of use is the highest may be set as the standard printer.

In the program of the first embodiment, the degree of similarity between the operation screen image of the printing device to be installed and the operation screen image of the standard printer is determined, based on the layout of operation screen images, presence/absence of each setting item and positions of display areas. Factors for determination, however, are not limited to the above. By way of example, determination may be made based on whether the name of each selection item is similar, how many selection items are displayed, or whether colors of operation screen images are similar.

The embodiments as have been described here are mere examples and should not be interpreted as restrictive. The scope of the present invention is determined by each of the claims with appropriate consideration of the written description of the embodiments and embraces modifications within the meaning of, and equivalent to, the languages in the claims.

What is claimed is:

1. A computer capable of setting a new environment close to a familiar environment for using a new electronic device, comprising:
    a first determining unit for determining whether or not a familiar environment for using a familiar electronic device used for the same usage as said new electronic device has been set in said computer; and
    a setting unit, for selectively executing, depending on a result of determination by said first determining unit, a process for setting a new environment for using said new electronic device in said computer using the familiar environment for using said familiar electronic device as a reference, and a process for setting a default environment for using said new electronic device in said computer, depending on a result of determination by said first determining unit;
    wherein the setting of new environment involves determination of a format of an operation screen image for setting operation conditions of a driver program;
    thereby simplifying use of the new electronic device for a user;
    said setting unit includes:
    a second determining unit for determining, in response to a determination by said first determining unit that said familiar environment has been set in said computer, whether two or more familiar environments are set in said computer,
    a selecting unit for selecting, in response to a determination that two or more familiar environments are set, an environment set as a default environment in said computer,
    a first setting unit for setting a new environment for using said new electronic device in said computer, using said default environment selected by said selecting unit as a reference, and
    a second setting unit for setting, in response to a determination by said first determining unit that said familiar environment has not been set in said computer, a predetermined default environment for said new electronic device in said computer.

2. The computer according to claim 1, wherein said setting of new environment involves installation of a driver program for driving said new electronic device in said computer and determination of a format of an operation screen image for setting operation conditions of the driver program; and
    said first setting unit includes a first driver program setting unit for setting the driver program of said new electronic device such that an operation screen image determined using an operation screen image used in said default environment selected by said selecting unit as a reference is used.

3. The computer according to claim 1, wherein said new electronic device is an image forming apparatus.

4. The computer according to claim 1, wherein said new electronic device is an image reading apparatus.

\* \* \* \* \*